United States Patent
Flores et al.

(10) Patent No.: US 7,768,404 B2
(45) Date of Patent: Aug. 3, 2010

(54) SYSTEM AND METHOD FOR OPTIMIZING RESOURCES IN A SUPPLY CHAIN USING RFID AND ARTIFICIAL INTELLIGENCE

(75) Inventors: Eduardo Ruiz Esparza Flores, San Pedro Garza Garcia (MX); Jose Adalberto Teran Matus, San Pedro Garza Garcia (MX)

(73) Assignee: RFID Mexico, S.A. De C.V., Nuevo Leon (MX)

( * ) Notice: Subject to any disclaimer, the term of this patent is extended or adjusted under 35 U.S.C. 154(b) by 131 days.

(21) Appl. No.: 11/770,813

(22) Filed: Jun. 29, 2007

(65) Prior Publication Data
US 2008/0218350 A1 Sep. 11, 2008

Related U.S. Application Data

(60) Provisional application No. 60/817,426, filed on Jun. 30, 2006.

(51) Int. Cl.
*G08B 13/14* (2006.01)

(52) U.S. Cl. ............... 340/572.4; 340/572.1; 340/10.1

(58) Field of Classification Search ............... 340/572.4
See application file for complete search history.

(56) References Cited

U.S. PATENT DOCUMENTS

| 7,225,981 B2 * | 6/2007 | Jongebloed ............ 235/385 |
| 7,443,282 B2 * | 10/2008 | Tu et al. ............ 340/10.1 |
| 2006/0082444 A1 * | 4/2006 | Sweeney et al. ......... 340/10.3 |

* cited by examiner

*Primary Examiner*—Daniel Wu
*Assistant Examiner*—Naomi Small
(74) *Attorney, Agent, or Firm*—Young & Thompson

(57) ABSTRACT

A system and method for optimizing resources in a supply chain and production line using RFID and artificial intelligence which can be adapted to any supply chain or product line, including warehouses, and which is able to optimize a plurality of tools/machinery or processing stations, a plurality of products and even personnel in real time by analyzing real time information about the entities and historic information stored in databases about optimum decisions taken in the past by the system.

10 Claims, 1 Drawing Sheet

A: ID key
B: data
C: transaction event report
D: receiving information
E: past transaction events
F: tasks
G: non-generated tasks
H: non-validated tasks
I: parameter values
J: information
K: validated tasks
L: rejected tasks
M: adjusted parameters A: ID key
B: data
C: transaction event report
D: receiving information
E: past transaction events
F: tasks
G: non-generated tasks
H: non-validated tasks
I: parameter values
J: information
K: validated tasks
L: rejected tasks
M: adjusted parameters

SYSTEM AND METHOD FOR OPTIMIZING RESOURCES IN A SUPPLY CHAIN USING RFID AND ARTIFICIAL INTELLIGENCE

CROSS-REFERENCE TO RELATED APPLICATIONS

This application claims the 35 U.S.C. §119(e) priority of U.S. Provisional Application No. 60/817,426 filed Jun. 30, 2006.

BACKGROUND OF THE INVENTION

A. Field of the Invention

The present invention is related to systems and methods for optimizing resources in a production supply chain and more particularly, to a system and method for optimizing resources such as material and human resources at any place of a supply chain or production areas by monitoring its location at the supply chain and production areas, monitoring used and available spaces and monitoring the productivity of human resources using automatic identification in order to control supply and production processes and make optimizing recommendations in real time using Evolutionary Computation and Expert systems.

B. Description of the Related Art

Over the last 20 years, the Automation and Information Technologies have impacted the Supply Chain in such way that coordination, operation and communication have improved significantly, reducing cost for errors or for not having visibility. Nevertheless, there are still many opportunities to improve the way it is working now since there is still a misconnection in the real operation at the very bottom level at every single activity between Workers, tools/Machinery and Products upon the time.

These misconnections mean different things depending on the step in the supply chain being analyzed. For example: In the day to day operations in a Manufacturing Plant, the lack of knowledge and understanding of what specific and unique item is crossing each work station (specific and unique item means differentiation between one can of coke and another one of the same product for example) could mean that it would be very difficult to identify a problem on the line of production exactly when it happens and even more, understand the reason of the problem by having the whole picture of people working on every work station and its correlation with other workers either in the same workstation or in other workstations, as well as the machinery/tools being used and the ones turned off, and finally the work-in process and bottle necks on the whole line of production.

Not having all this information on time could result in a wrong decision to solve a problem or not making a decision at all. On the contrary, by having these information in Real Time could mean making a decision before a problem happens. This is possible by processing data generated at the line of production on every movement. Of course, if every entity is tracked in real time, that means a huge amount of data generated on every second. In order to process these data, Information Technology Systems are needed, while in order to make decisions with this data, Evolutionary Computation is needed (area of Artificial Intelligence), and in order to learn from such decisions, Expert Systems (area of Artificial Intelligence) are used to compare new decisions suggested by the Evolutionary Computation with the results obtained from previous decisions.

A similar example is applicable in a Distribution Center where more players come to the equation like the customers urging for products, different type of tools capable of doing the same work (different capabilities of forklifts, carts, platform trucks, hand trucks and etcetera), distance form current point to destiny compared with distance for other workers to perform the same activity (cost) and other related implications. Monitoring all these entities in order to ensure a perfect and computer assisted functionality similar like the one described for a Manufacturing Plant brings the same type of solution combining real time identification technologies, Evolutionary Computation and Expert systems as well.

There have been developed systems and methods for optimizing supply chains and production lines but none of them are able to offer optimizing solution in real time based on real time information.

In view of the above, applicant developed a system and method for optimizing resources in a supply chain and production line using RFID and artificial intelligence which can be adapted to any supply chain or product line, including warehouses, and which is able to optimize a plurality of tools/machinery or processing stations, a plurality of products and even personnel in real time by analyzing real time information about said entities and historic information stored in databases about optimum decisions taken in the past by the system.

The system and method of the present invention has the following further advantages:

a Reduce chances for Human Error.

Anticipates operational problems working in preventive mode by analyzing trends in Real Time.

Optimize the usages of resources: cost, time, priorities, etc.

Makes intelligent decisions considering ALL players and their real time situation in few seconds.

Learns from Intelligent Decisions taken for making more intelligent decisions every day.

SUMMARY OF THE INVENTION

It is therefore a main object of the present invention to provide a system and method for optimizing resources in a supply chain and production line using RFID and artificial intelligence, which is able to optimize a plurality of tools/machinery or processing stations, a plurality of products and even personnel in real time by analyzing real time information about said entities and historic information stored in databases about optimum decisions taken in the past by the system.

It is another main object of the present invention to provide a system and method of the above referred nature which can be adapted to any supply chain or product line, including warehouses.

It is still another object of the present invention to provide a system and method of the above referred nature which Reduce chances for Human Error and anticipates operational problems working in preventive mode by analyzing trends in Real Time.

It is a further object of the present invention to provide a system and method of the above referred nature which makes intelligent decisions considering ALL players and their real time situation in few seconds, and learns from intelligent decisions taken for making more intelligent decisions every day.

These and other objects and advantages of the system and method for optimizing resources in a supply chain and production line using RFID and artificial intelligence of the present invention will become apparent to those persons hav-

DETAILED DESCRIPTION OF THE INVENTION

Figure 1:
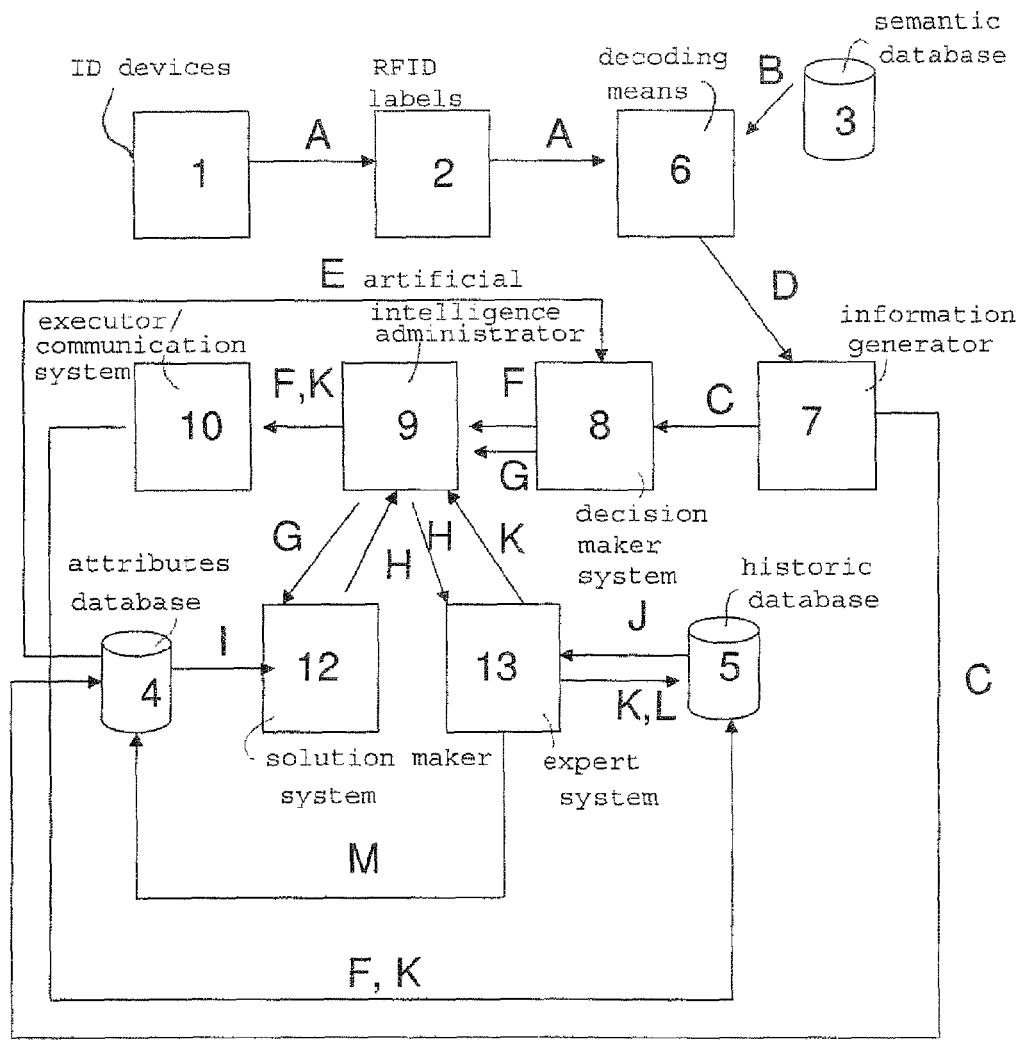
FIG. 1 is a diagram of the system for optimizing resources in a production line and supply chain using rfid and artificial intelligence of the present invention, showing all their elements and information flows.

The system and method for optimizing resources in a production line and supply chain using rfid and artificial intelligence will now be described in accordance with a preferred embodiment thereof and making reference to the accompanying FIGURE, wherein the same signs and numbers, refer to the same parts of the shown figures.

The system and method of the present invention which may be adapted to optimize any production site having a plurality of tools/machinery or processing stations, a plurality of products and personnel comprising:

a plurality of automatic identification devices 1 for a plurality of entities, comprising:

a plurality of automatic identification devices for a plurality of products, each comprising a Radio Frequency Identification Label for each product and each assigned with a unique identification key which identify each product;

a plurality of automatic identification devices for a plurality of assets, tools or machinery, each comprising a Radio Frequency Identification Label for each asset, tool or machinery and each assigned with a unique identification key which identify each asset, tool or machinery;

a plurality of automatic identification devices for a plurality of persons, each comprising a Radio Frequency Identification Label for each person and each assigned with a unique electronic identification key having several sets of characters which identify each asset, tool or machinery;

means for detecting and collecting data from the plurality of Radio Frequency Identification Labels 2, said data comprising identification keys A;

a semantic database 3, containing data B for decoding the identification key of each Radio Frequency Identification Label;

a database containing attributes, business rules, history of performance of each entity including parameter values and past transactions 4, wherein said attributes are related with a specific entity or with a catalog of types or families of entities mainly for identification, description, functionality, performance;

a historic task database 5, containing information about tasks already taken and approved;

means for decoding the identification key A of each Radio Frequency Identification Label 6, received from the means for detecting and collecting data from the plurality of Radio Frequency Identification Labels 2, receiving data B from the semantic database 3 for identifying the entity to which it is related;

a transaction event information generator 7, generating a transaction event report C for each movement detected by the means for detecting and collecting data from the plurality of Radio Frequency Identification Labels 2, receiving information D from the means for decoding the identification key of each Radio Frequency Identification Label 6, and processing information such as location and time and generating a transaction event report C for the related entity including information such as: identification keys, entity identification information, location, time, performance and status, and recording said transaction event report C to the database containing attributes, business rules, history of performance of each entity including parameter values and past transactions 4;

a transaction monitor and simple decision maker system 8, receiving the transaction event report C from the transaction event information generator 7, and further receiving: attributes related to the entity and information of current and past transaction events E for the entity from the attributes database 4, said transaction monitor and simple decision maker system 8 detecting any new transaction for each entity and generating one or more tasks F for optimizing the production process such as recommending an inspection needed for an item not getting to the destination, said task F being sent to an artificial intelligence administrator 9. If the transaction monitor and simple decision maker system 8 could not generate one or more tasks with the received information (transaction event report, attributes related to the entity and information of current and past transaction events for the entity), then said information is sent as a non generated task G to the artificial intelligence administrator 9;

an artificial intelligence administrator 9 receiving one or more tasks F or non-generated tasks G (which includes information comprising: transaction event report, attributes related to the entity and information of current and past transaction events for the entity) from the transaction monitor and simple decision maker system 8, wherein said artificial intelligence administrator 9 sending said tasks F to an executor/communication system 10. If the artificial intelligence administrator 9 receives any non generated task G, then it sends the information of the non generated task G to an Evolutionary Computing Solution Maker System 12, from which it receives a non validated task H which is sent to an Expert System for validation 13;

an Evolutionary Computing Solution Maker System 12 running a Genetic Algorithm or other Evolutionary Computing Paradigm, receiving information of a non generated task G comprising: transaction event report, attributes related to each entity, transaction history information related to the entity, and current transaction history related to the entity from the artificial intelligence administrator 9, said Evolutionary Computing Solution Maker System further receiving parameters values I from the database 4 for generating a non-validated task H which is sent to the Artificial Intelligence Administrator 9;

an expert system 13 receiving a non-generated task H generated by the Evolutionary Computing Solution Maker System 12, from the Artificial Intelligence Administrator 9 and validates it based on information J received from the historic task database 5 and returns a validated task K to the Artificial Intelligence Administrator 9 or generates a rejected task L. The expert system 13 approves and validates the task if a very similar task already exists in the historic database 5, and the evaluation of the results for said similar task is acceptable based on the parameters stored in database 4. If the results of the task are not satisfactory (based on the results of applying such solution said results comprising the information J received from the historic database), then the task is rejected and a rejected task L is generated. If there is not similar task in the historic task database 5, then the validated task is generated K and is recorded in the historic task database 5 as an approved task. If the task is rejected, then the parameters for the Evolutionary Computing Solution Maker System 12 are adjusted by the Expert System for affecting the generation of the next task, and thus send adjusted parameters M to the database 4. The parameters for the Evolutionary Computing Solution Maker System 12 can also be adjusted manually.

An executor/communication system 10 which receives tasks F and validated tasks K from the Artificial Intelligence Administrator 9 and notificates or execute said task or tasks, F, K. The notification could be to a human through any output device or to another system or equipment, and the execution could be interacting with another computer, system, machinery, intelligent agent, robot, or CPU. The executor/communicator also records the task F and validated tasks in the historic task database 5.

The method for optimizing resources in a supply chain using rfid and artificial intelligence in accordance with the present invention comprises:

obtaining identification information and attributes, from a plurality of entities using RFID and further obtaining transactions history for said plurality of entities from one or more databases;

processing said identification information and attributes using simple decision maker system further detecting any new transactions for said entities in order to generate one or more tasks or recommendations for optimizing the production process and further:

send said task or task to an artificial intelligence administrator as generated tasks;

if no task can be generated with the obtained information then send said information as a non-generated task to an artificial intelligence administrator;

processing generated tasks, information related to a non-generated task, and using an artificial intelligence administrator in order to:

send generated tasks and approved tasks to an executor/communication system for execution or communication of the task;

send information related to non generated tasks to an Evolutionary Computing Solution Maker System;

processing the information related to non generated tasks and parameters values related to the historic performance of generated tasks from a database using an Evolutionary Computing Solution Maker System running a Genetic Algorithm or other Evolutionary Computing Paradigm in order to generate a non validated task;

send the non validated task generated by the Evolutionary Computing Solution Maker System to an Expert system for its validation;

processing the non validated tasks received from the Evolutionary Computing Solution Maker System using an expert system for approving or rejecting the tasks by:

approving the task if a very similar task already exist in historic databases, and the evaluation of the results for said similar task are acceptable based on predetermined parameters;

approving the task if there is not similar task in historic databases and begin to record results for said task in a database;

rejecting the task if a very similar task already exist in historic databases, and the evaluation of the results for said similar task are not acceptable based on historic predetermined parameters for an entity and adjust the parameters for the Evolutionary Computing Solution Maker System for affecting the generation of the next task; and sending the approved tasks to the artificial intelligence administrator.

The system and method of the present invention provide a plurality of tasks or recommendations in real time thanks to the continuous monitoring of all the entities of the production line and supply chain by using real time identification technologies, evolutionary computation and expert systems as well.

Since the provided tasks and recommendations are evaluated considering the positive and negative results obtained by past tasks, it is assured that the task or recommendation provided will yield positive results when it is applied to the supply chain and or production line.

Finally, it must be understood that the system and method for optimizing resources in a production line and supply chain using rfid and artificial intelligence, of the present invention, is not limited exclusively to the embodiment above described and that the persons having ordinary skill in the art can, with the teaching provided by the invention, to make modifications to the The system and method for optimizing resources in a production line and supply chain using rfid and artificial intelligence of the present invention, which will clearly be within of the true inventive concept and of the scope of the invention which is claimed in the following claims.

We claim:

1. A system for optimizing entity resources in a production line and supply chain comprising:

a plurality of automatic identification devices for a plurality of entity resources, said identification devices each comprising a Radio Frequency Identification Label;

means for detecting and collecting data from the plurality of automatic identification devices, said data comprising identification keys;

one or more databases containing information about: data for decoding identification keys of each identification devices, attributes, business rules, history of performance of each entity including parameter values and past transactions, wherein said attributes are related with a specific entity or with a catalog of types or families of entities mainly for identification, description, functionality, performance, and information about tasks already taken and approved;

means for decoding the identification key of each automatic identification device receiving data for decoding identification keys of each automatic identification devices from the one or more databases, for identifying the entity to which it is related;

a transaction event information generator, generating a transaction event report for each movement detected by the means for detecting and collecting data from the plurality of automatic identification devices, receiving information from the means for decoding the identification key of each Radio Frequency Identification Label, and processing information and generating the transaction event report for the related entity including information;

a transaction monitor and simple decision maker system, receiving the transaction event report from the transaction event information generator and further receiving: attributes related to the entity and information of current and past transaction events for the entity from the one or more databases, said transaction monitor and simple decision maker system detecting any new transaction for each entity and generating one or more tasks, said task being sent to an artificial intelligence administrator, and if no task is generable the received information: transaction event report, attributes related to the entity and information of current and past transaction events for the entity, is sent as a non-generated task to the artificial intelligence administrator;

an artificial intelligence administrator receiving one or more tasks or non-generated tasks from the transaction monitor and simple decision maker system, wherein said artificial intelligence administrator sending said task to an executor/communication system, and sending the non-generated task to an Evolutionary Computing Solution Maker System, from which it receives a non-validated task which is sent to an Expert System for validation;

an Evolutionary Computing Solution Maker System, receiving information of a non-generated task comprising: transaction event report, attributes related to each entity, transaction history information related to the entity, and current transaction history related to the entity from the artificial intelligence administrator, said Evolutionary Computing Solution Maker System further receiving parameters values from the one or more databases for generating a non-validated task which is sent to the Artificial Intelligence Administrator;

an expert system receiving a non-generated task generated by the Evolutionary Computing Solution Maker System, from the Artificial Intelligence Administrator and validates it based on information about tasks already taken and approved received from the one or more databases and returns a validated task or a rejected task to the Artificial Intelligence Administrator; and an executor/communication system which receives tasks and validated tasks from the Artificial Intelligence Administrator and notifies or execute said task or tasks, and records the task and validated tasks in the historic task database.

2. A system for optimizing resources in a production line and supply chain as claimed in claim 1, wherein the plurality of automatic identification devices comprising:

a plurality of automatic identification devices for a plurality of products, each comprising a Radio Frequency Identification Label for each product and each assigned with a unique identification key which identify each product;

a plurality of automatic identification devices for a plurality of assets, tools or machinery, each comprising a Radio Frequency Identification Label for each asset, tool or machinery and each assigned with a unique identification key which identify each asset, tool or machinery;

a plurality of automatic identification devices for a plurality of persons, each comprising a Radio Frequency Identification Label for each person and each assigned with a unique electronic identification key having several sets of characters which identify each asset, tool or machinery.

3. A system for optimizing resources in a production line and supply chain as claimed in claim 1, wherein the system including three databases comprising:

a semantic database containing data for decoding the identification key of each Radio Frequency Identification Label;

a database containing attributes, business rules, history of performance of each entity including parameter values and past transactions, wherein said attributes are related with a specific entity or with a catalog of types or families of entities mainly for identification, description, functionality, performance; and a historic task database containing information about tasks already taken and approved.

4. A system for optimizing resources in a production line and supply chain as claimed in claim 1, wherein the transaction monitor and simple decision maker system generates a task for optimizing the production process.

5. A system for optimizing resources in a production line and supply chain as claimed in claim 1, wherein the Evolutionary Computing Solution Maker System runs a Genetic Algorithm or other Evolutionary Computing Paradigm.

6. A system for optimizing resources in a production line and supply chain as claimed in claim 1, wherein the expert system:

approves the task and validates the task if a very similar task already exists in the one or more databases, and the evaluation of the results for said similar task is acceptable based on parameters stored in the one or more databases;

approves and records a task, as an approved task in the one or more databases if there is not similar task in the one or more databases; and rejects a task If the results of the task are not satisfactory based on the results of applying such solution, said results comprising the information received from the one or more databases.

7. A system for optimizing resources in a production line and supply chain as claimed in claim 1, wherein the notification or execution actions comprise a notification to a human through any output device or to another system or equipment, and the execution is able to interact with another computer, system, machinery, intelligent agent, robot, or CPU.

8. A method for optimizing resources in a production line and supply chain comprising:

obtaining identification information and attributes, from a plurality of entities using RFID and further obtaining transactions history for said plurality of entities from one or more databases;

processing said identification information and attributes using simple decision maker system further detecting any new transactions for said entities in order to generate one or more tasks or recommendations for optimizing the production process and further:

sending said task or task to an artificial intelligence administrator as generated tasks;

if no task is generable with the obtained information then sending said information as a non-generated task to an artificial intelligence administrator;

processing generated tasks, information related to a non-generated task, and using an artificial intelligence administrator in order to: send generated tasks and approved tasks to an executor/communication system for execution or communication of the task; and send information related to non-generated tasks to an Evolutionary Computing Solution Maker System;

processing the information related to non-generated tasks and parameters values related to the historic performance of generated tasks from a database using an Evolutionary Computing Solution Maker System running a Genetic Algorithm or other Evolutionary Computing Paradigm in order to generate a non-validated task;

sending the non-validated task generated by the Evolutionary Computing Solution Maker System to an Expert system for its validation; and processing the non-validated tasks received from the Evolutionary Computing Solution Maker System using an expert system for approving or rejecting the tasks by:

approving the task if a very similar task already exist in historic databases, and the evaluation of the results for said similar task are acceptable based on predetermined parameters, approving the task if there is not similar task in historic databases and begin to record results for said task in a database, rejecting the task if a very similar task already exist in historic databases, and the evaluation of the results for said similar task are not acceptable based on historic predetermined parameters for an entity and adjust the parameters for the Evolutionary Computing Solution Maker System for affecting the generation of the next task, and sending the approved tasks to the artificial intelligence administrator.

9. A system for optimizing entity resources in a production line and supply chain as claimed in claim 1, wherein, said processing information includes location and time information and the related entity included information includes identification keys, entity identification information, location, time, performance and status information.

10. A system for optimizing entity resources in a production line and supply chain as claimed in claim 1, wherein, the transaction monitor and simple decision maker system generates a task for optimizing the production process including recommending an inspection needed for an item not getting to the destination.

* * * * *